J. H. SILLEY AND E. F. SPANNER.
CONSTRUCTION OF SHIPS.
APPLICATION FILED DEC. 10, 1918.
1,323,920.
Patented Dec. 2, 1919.
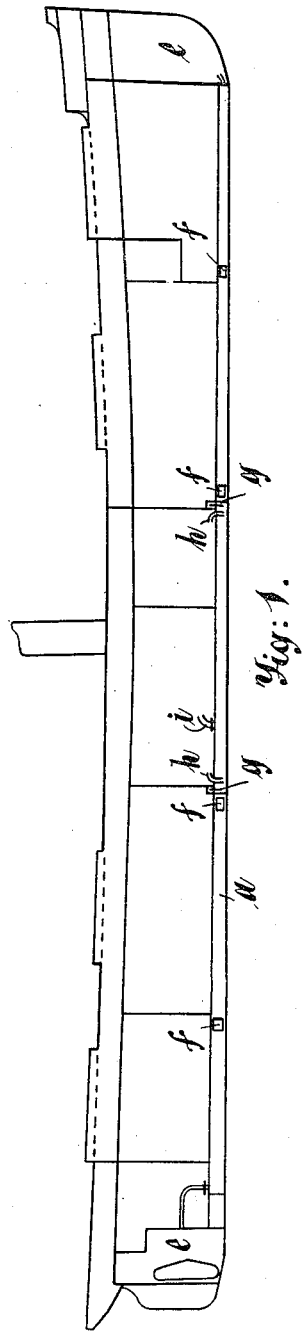
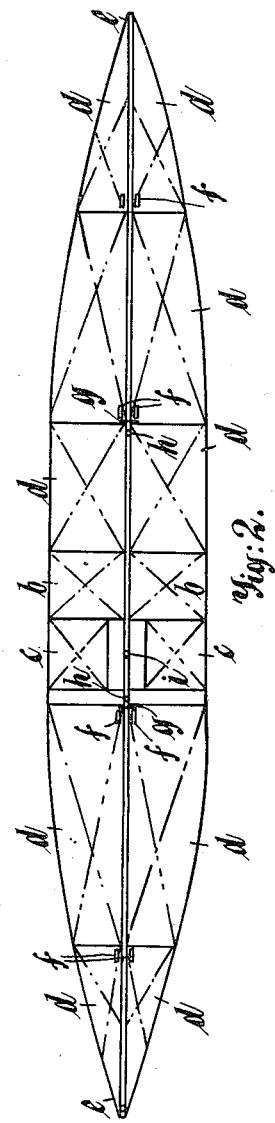
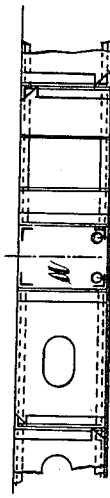
INVENTORS:
John Henry Silley
Edward Frank Spanner
BY Wm Wallace White
ATTY.

UNITED STATES PATENT OFFICE.

JOHN H. SILLEY, OF BICKLEY, AND EDWARD FRANK SPANNER, OF BROCKLEY, LONDON, ENGLAND.

CONSTRUCTION OF SHIPS.

1,323,920.  Specification of Letters Patent.  Patented Dec. 2, 1919.

Application filed December 10, 1918. Serial No. 266,065.

*To all whom it may concern:*

Be it known that we, JOHN HENRY SILLEY and EDWARD FRANK SPANNER, subjects of the King of Great Britain and Ireland, residing at, respectively, Fernside, Oldfield Road, Bickley, in the county of Kent, England, and 3 Adelaide road, Brockley, London, S. E., England, have invented Improvements in the Construction of Ships, of which the following is a specification.

This invention relates to improvements in the construction of the keels of ships and has for its means associated therewith and has for its object the provision of a continuous fore and aft duct in the keel of the ship avoiding the use of a central keel plate adapted so that it can be utilized for the purpose of dealing in a controllable manner with liquid either in the form of water for ballasting and other purposes or in the form of oil to be used as fuel or for any other purpose in which it is necessary to remove liquid from one part of the hull to another part of the hull.

The invention consists in the special formation of the keel structure without a central keel plate so as to form an unobstructed duct or pipe preferably of rectangular section which would run from end to end along the center line of the vessel, and in connection with this duct to provide means for dividing it into distinct sections so that any one section of the duct can be cut off from the adjoining section or sections, and also in the provision of means by which portions of the vessel outside the duct or pipe can be connected thereto by controllable means.

To carry the invention into effect in place of the ordinary single vertical keel plate common in ship construction, two plates are arranged preferably at an equal distance from each side of the center of the ship. These two keel plates are connected to the inner and outer bottoms by any suitable means such as angle irons and the whole of the construction is made liquid tight from end to end so far as is necessary to make it a liquid container.

In order to subdivide the duct or pipe into distinct sections one or more sluice valves or similar devices are arranged at a point or points along its length and means are provided by which said sluice valves can be operated outside the pipe or duct.

At intervals along the pipe or duct controllable communicating means are provided in order to connect the pipe or duct up to compartments in the vessel containing liquid, for example, the ballast tanks or the liquid fuel tanks, or both.

The pumping machinery of the vessel is connected by suitable piping with the space within the pipe or duct so as to draw liquid from any compartment and discharge it into any other compartment or any desired part of the vessel.

The duct or pipe is so constructed as to have a substantially clear section throughout the length of the keel in order to give ready access to every part of its interior and to insure a free passage for fluid.

When used for dealing with heavy oil, heating pipes may be arranged along the duct in order to liquefy the oil to facilitate pumping operations.

The duct being really a long fore and aft compartment would be fitted with air escape pipes and manholes similar to any other double bottom compartment.

It will be recognized that one advantage of utilizing a duct or pipe constructed in the manner described is that a continuous duct is afforded without encroaching on the cargo space and without impairing in any way the watertightness of the transverse bulkheads.

The construction of the keel in the manner indicated adds to the strength of the vessel longitudinally particularly when subjected to hogging strains, and also to the strength of the vessel when docked without any detriment to its transverse strength.

The invention is particularly applicable to the carrying out of any scheme for correcting the trim and stability of the vessel when she has been damaged by adding ballast to or removing ballast at one end or the other or on one side or the other of the ship.

The provision of sluice valves at points along its length enables any portion of the duct to be cut off for example one which may have been damaged or the parts connected with it may have been damaged so that the system as a whole will not be put out of commission.

In the case of boiler rooms being disposed directly over the duct a horizontal cofferdam may be arranged forming a protection between the boiler room space and that of the duct or pipe if such pipe or duct is to be used for oil fuel.

By adopting this invention in a vessel carrying oil as fuel it is possible to provide efficient means of bringing the oil from either end of the vessel to the boiler room without the necessity of fitting long and elaborate pipe lines through the various holds all of which in ordinary circumstances cause endless inconvenience, interfering as they do with stowage of cargo, and necessitating numerous holes through the watertight bulkheads.

According to this invention the strength of the vessel transversely will not be lessened. The bulkheads, which determine the form of the ship, will not be measurably reduced in strength by the omission of the plating where the duct passes them, and the framing between the bulkheads can have a strong and efficient connection to what is virtually a box girder of substantial strength in itself.

So far as the longitudinal strength is concerned, it is obvious that a considerable increase can be made in the strength of the keel, considered as a whole. Against docking stresses, the box girder will certainly be much stronger than the ordinary single plate vertical keel, and should the vessel be badly docked, i. e. off the middle line, it is likely to be less severely strained than a vessel of ordinary form docked in a similar bad position.

Owing to the division of the duct into distinct sections damage to either the forward or after parts can only be sustained by severe damage to the ship in those regions in virtue of the position and solid construction of the duct itself. The closing of one or more of the sluice valves fitted would isolate the damaged portion from the rest of the duct and leave the undamaged portion free for the transmission of water or oil to trimming compartments or tanks for the purpose of adjusting the trim of the vessel by the Brunton or any equivalent system.

Damage to the center portion of the duct is extremely unlikely and could only be of sufficient importance to put the duct out of commission if the blow, explosion or other cause of damage were sufficient to severely injure not only the duct but the adjacent outer and inner bottom of the vessel, in which case the duct could not be used, as the damage would most probably have interfered with the pumping plant.

Further, damage in this portion of the vessel would not require the service of the duct for trimming or correcting her, so that the loss of its use for those purposes would not be of paramount importance.

In the case of a vessel in which the duct was used for the transference of oil from double-bottom and other tanks from the machinery compartments, damage of the character last indicated could be provided against as an emergency by keeping the settling tanks, which would probably be fitted, always well filled with oil, these tanks being available in the case of emergency.

The question of the transference of oil or water from any one of the compartments will naturally be affected by the trim of the vessel. For instance, if the vessel is down by the stern and the tank which it is desired to pump out is also at the stern, it would not be possible with this to clear it by using the duct.

It would therefore be necessary to exercise discretion in pumping out the tanks so that the trim as far as possible always assisted the operation of clearing any one of the tanks. To this end it might be necessary to pump out the tanks on a system which dealt with the end tanks first.

In case of emergency it is of course possible to adjust the trim of the vessel very quickly and simply by the use of the duct, so that special circumstances could be met. The stability of the vessel would be improved by the fitting of this duct, as a permanent obstruction is offered to the rapid transference of either oil or water from one side of the ship to the other, this obstruction being greater than in the case of an ordinary vessel in which some of the tanks go right across the ship. On the other hand, no detriment results from the presence of the duct so far as heel is concerned, as by opening the valves connecting the duct with the double bottom compartments on both the port and starboard sides, a uniform level will be maintained on both sides of the ship, there being no tendency for one side to be emptied quicker than the other.

A permanent connection is provided between the pumping plant and the double-bottom and other hold compartments in which fluid might be carried, without the necessity of fitting numerous long lengths of pipes, with the consequent continual piercing of watertight bulkheads or other partitions.

Again the duct does not interfere with the stowage of cargo and leaves the holds much clearer than when provision has to be made for the efficient shielding of long systems of pumping pipes and valves, while the duct can be fitted with practically no extra expense and extremely little, if any, extra weight.

Access to any part of the duct can be obtained quite simply by entering the duct itself at any one of a few accessible positions at which manholes would be fitted. It is thus possible to deal with any temporary valve trouble or other derangement without disturbing cargo.

The large sectional area of the pipe would render the transfer of oil from one part of the ship to another much easier than where separate small pipe lines have to be fitted through which a much higher velocity of flow is essential than through the duct. Heating arrangements now necessary in the tanks and adjacent to the oil fuel pipes could be dispensed with, except along the length of the duct itself, thus a considerable amount of heating pipe could thus be saved.

Owing to the manner in which the duct is fitted, water entering the ship at any one point cannot find its way to another undamaged portion of the vessel through the medium of the duct, except under the control of the ship's officers. The ship is thereby rendered very much safer than at present when the failure of any one of a numerous series of pipes will allow water to enter compartments sometimes far from the place of the actual damage.

In order that the invention may be the better understood we will now proceed to describe the same in relation to the accompanying drawing, reference being had to the letters and figures marked thereon. Like letters refer to like parts in the various figures, in which:—

Figure 1 is a longitudinal vertical section of a vessel showing the position of the duct, the various means of communication therewith and the control of operation of same.

Fig. 2 is a sectional plan of the vessel just above the duct.

Fig. 3 is an athwartship section showing two alternative methods of construction of the ship framing, that on the left side being of the plate frame system and that on the right side being of the bracket frame system.

As seen from the drawing the duct $a$ extends practically along the whole length of the vessel and forms the basis of the structure thereof. $b$ are the ballast tanks, $c$ the feed tanks, $d$ the oil fuel tanks, and $e$ the forward and after trimming compartments.

At points along the duct valves $f$ are provided on the duct for communication with the oil fuel tanks $d$. The duct is divided along its length by valves $g$ transversely disposed therein so that each section so divided can be separated from the adjoining section. The pipe $h$ has one end communicating with the duct and the other end communicating with the fuel or ballast pumps in the engine room and another pipe $i$ is arranged to connect the duct with the circulating or other pump for the purpose of trimming the ship in case of damage.

Along the duct on each side thereof heating pipes $k$ can be provided in order to heat the oil fuel.

It will be seen that by means of the arrangements as set out in the drawing the various purposes hereinbefore described can be readily effected.

We are aware that it has been proposed to form the keel of a ship as a hollow structure of any desired section and to leave such hollow structure open at both ends so that water can pass freely through and also to provide fore and aft ducts each side of a central keel plate having valves for communication with various compartments for admitting water to or withdrawing water therefrom through the said ducts for varying the immersion of the ship's hull, and we do not claim such features broadly.

We claim:—

1. In ship construction, a keel structure formed as a centrally disposed liquid tight unobstructed duct running from one end of the ship to the other in combination with controllable means adapted to connect the said duct with portions of the vessel outside the said duct and means for adding liquid to or withdrawing liquid from any of the said portions through the said duct, substantially as described.

2. In a ship construction as claimed in claim 1 the arrangement of controllable means for dividing the said duct into distinct sections, substantially as described.

3. In a ship construction as claimed in claim 1 the arrangement of heating pipes in said duct for heating the liquid contained therein, substantially as described.

In testimony whereof we have signed our names to this specification in the presence of two subscribing witnesses.

JOHN H. SILLEY.
EDWARD FRANK SPANNER.

Witnesses:
   DORIS HITCHCOCK,
   WALTER CARIER.